United States Patent [19]

Smolin et al.

[11] 3,916,926

[45] Nov. 4, 1975

[54] LIQUID LEVEL CONTROL SYSTEM

[75] Inventors: Michael Smolin, Brookline; Sanders Goldstein, Cambridge, both of Mass.

[73] Assignee: P. R. Mallory & Co. Inc., Indianapolis, Ind.

[22] Filed: July 25, 1974

[21] Appl. No.: 491,698

[52] U.S. Cl. .................... 137/2; 137/392; 324/34 R
[51] Int. Cl.² ........................................... B08B 3/04
[58] Field of Search .......... 137/392, 1, 2; 73/304 R; 324/34 R

[56] References Cited
UNITED STATES PATENTS

| | | | |
|---|---|---|---|
| 2,433,599 | 12/1947 | Cohen | 137/392 |
| 2,648,058 | 8/1953 | Breedlove | 73/304 X |
| 3,058,345 | 10/1962 | Mastras | 73/304 |
| 3,285,275 | 11/1966 | Couffer | 137/392 |
| 3,511,580 | 5/1970 | Eckhardt | 137/392 X |

FOREIGN PATENTS OR APPLICATIONS 663,643  12/1951  United Kingdom ................ 137/392

*Primary Examiner*—Alan Cohan
*Attorney, Agent, or Firm*—Charles W. Hoffmann; Robert F. Meyer; Donald W. Hanson

[57]    ABSTRACT

A first inductance means, such as a coil, cooperates with a detector/amplifier circuit to detect the level of a liquid in a container and to control the flow of the liquid into the container. A second inductance means detects the level of the liquid in the event of failure of the first inductance means.

27 Claims, 2 Drawing Figures

LIQUID LEVEL CONTROL SYSTEM

Generally speaking, the present invention relates to liquid level control systems and more particularly to a control system for sensing and controlling a level of a liquid, comprising an inductance means for producing an inductive field, a supply means for providing a liquid in close proximity to the inductance means, a detector/amplifier circuit connected to the inductance means to provide a signal in response to a change in the quality factor (Q) of the inductance means, a signal conditioner for conditioning the signal from the amplifier, a switching means responsive to the conditioned signal, and a liquid controller responsive to the switching means.

In many applications, it is desirous to detect the level of a liquid in a container. In response to the presence of a liquid level, an electrical signal may be produced to activate any number of devices such as an alarm or a controller for governing the flow of a liquid into a container. One example of a liquid level detector is used in a washing machine to turn a water supply valve off when the level reaches a predetermined position. The present invention provides a liquid level sensing means with failsafe backup, that can be used with many different kinds of containers and liquids to produce an electrical signal. The signal may be used to trigger a variety of devices. One embodiment illustrated herein utilizes this signal to control a solenoid-operated water valve in a clothes washing machine.

Accordingly, it is a feature of the present invention to provide a control system for sensing the level of a liquid such as water. Another feature of the present invention is to provide a liquid level sensing means that includes a failsafe coil for sensing a liquid level in the event a detector coil fails to do so. Another feature of the present invention is to utilize a non-redundant component of the detector/amplifier circuit as the failsafe coil. Another feature of the present invention is to provide a control system for sensing the level of a liquid that includes an inductance means for producing an inductive field. Another feature of the present invention is to provide a control system for sensing the level of a liquid, such as a mineral-containing water, including a supply means for providing the liquid in close proximity to an inductance means. Yet another feature of the present invention is to provide a control system for sensing the level of a liquid that includes a detector/amplifier circuit connected to an inductance means to provide a signal in response to a change in the Q of the inductance means. Still another feature of the present invention is to provide a control system for sensing the level of a liquid including an electrical insulation means to isolate an inductance means from the liquid. Another feature of the present invention is to provide a control system for sensing the level of a liquid including a plurality of coils wound around a hollow tube through which a liquid may rise, each coil being able to select a level of the liquid, and a selector means for selecting any one of the coils to function with a detector/amplifier circuit. Another feature of the present invention is to provide a control system for sensing the level of a liquid including a switching means responsive to a detector/amplifier circuit. Yet another feature of the present invention is to provide a control system for sensing the level of a liquid including a solenoid-operated valve to control the amount of liquid entering a container. Yet another feature of the present invention is to provide a method of sensing a predetermined level of a liquid in a container comprising the steps of running the liquid into the container through a solenoid-operated valve from a liquid source, producing electrical oscillations in an inductance coil located in spaced relation to the level of the liquid in the container, detecting a quenching of oscillation in the inductance coil in response to the level of said liquid coming into close proximity to the coil, producing an electrical signal in response to the quenching of oscillation, amplifying the electrical signal, triggering a switching means with the amplified electrical signal, switching electrical current through the switching means to the solenoid-operated valve, and closing the solenoid-operated valve cutting off the flow of the liquid into the container.

These and other features will become more apparent from the following description taken in conjunction with the drawings wherein.

Figure 1:
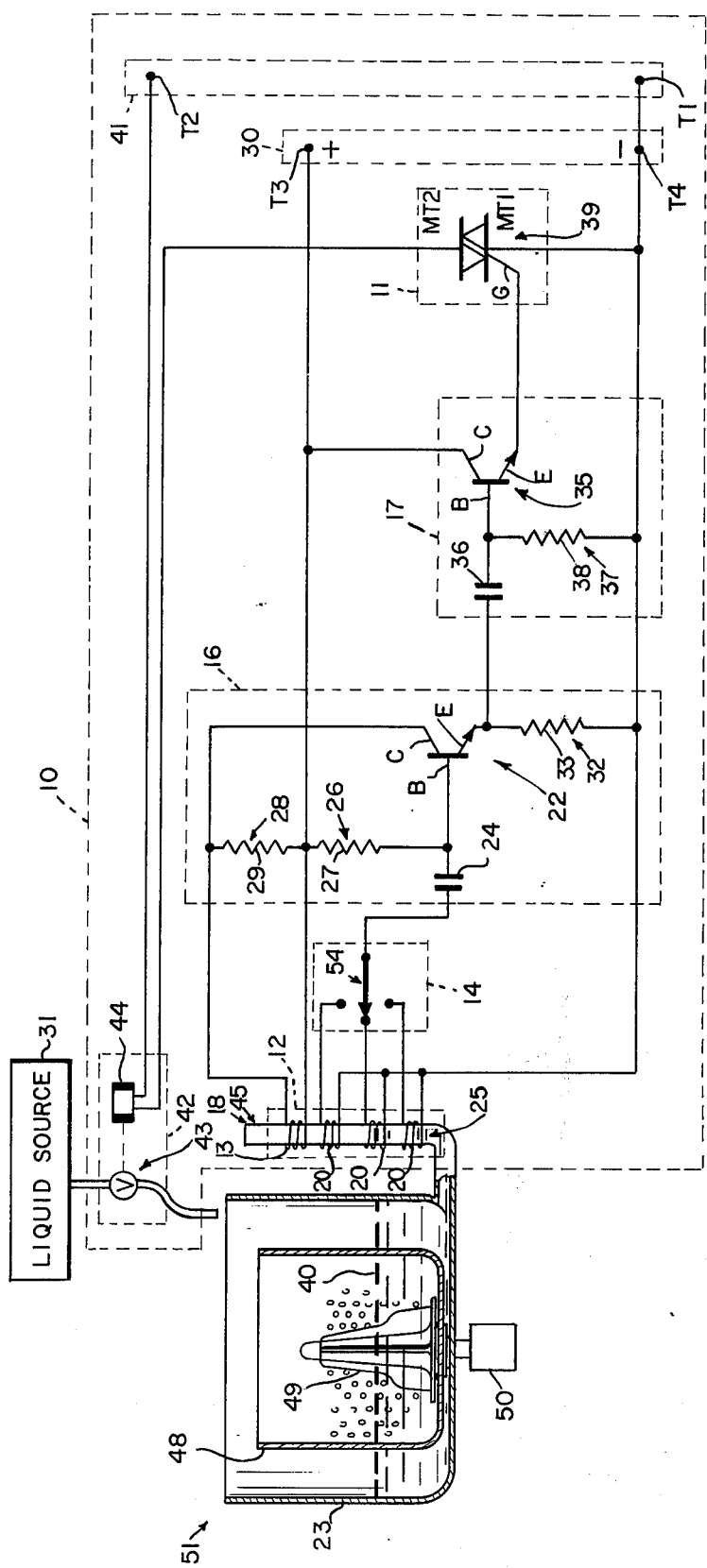
FIG. 1 is a wiring diagram of a control system for detecting and controlling a liquid level in a container showing an inductance means wound around a hollow tube coil former.

One embodiment of a liquid level control system 10, illustrated in FIG. 1, generally comprises an inductance means 12, a selector means 14, a detector/amplifier circuit 16, a signal conditioner 17, a switching means 11, liquid supply means 25, a container 23, and a liquid supply controller 42.

Inductance means 12 for producing an inductive field, comprises a failsafe coil 13 and detector coils 20. The number of coils 20 is immaterial to the operation of the circuit (FIG. 1 shows three) because selector means 14 singles out only one coil 20 a time to be used with detector/amplifier circuit 16. Selector means 14 in the illustrative embodiment comprises a selector switch 54. Each of coils 20 is wound on a coil former 45 for holding and shaping the coils. In FIG. 1 one embodiment of coil former 45 is the outer surface of a hollow tube 18 connected to container 23. Each of coils 20 can determine a different level of a liquid.

Failsafe coil 13 comprises a coil of wire wound on hollow tube 25 above coils 20. Coil 13 is connected directly to detector/amplifier circuit 16 and is used to detect a liquid level in the event the selected coil 20 fails to do so. For example, dry particle accumulation (scale) build-up in the proximity of coil 20 may desensitize that detector coil. In this case coil 13 would detect the presence of the liquid when it comes in close proximity to coil 13. In the example of a washing machine, the failure of coil 20 to detect the level of water would result in the water rising to the level of coil 13 where it would be detected. As will be explained later, detection of the liquid level results in the termination of liquid supply to container 23. So, in this example, coil 13 prevents overflowing of the water from the washing machine.

Selector means 14 for selecting a coil 20 for use with detector/amplifier circuit 16 is shown in FIG. 1 as a selector switch. Other selectors such as stepping relays and solid-state switches may be used without departing from the spirit and gist of the invention.

Detector/amplifier circuit 16 includes an NPN transistor 22, the base B of which is connected to a first side of capacitor 24 and a first side of a resistance means 26.

The collector C of transistor 22 is connected to a first side of a resistance means 28 and to a first side of coil 13. The emitter E of transistor 22 is connected to signal conditioner 17 and a first side of a resistance means 32. Second sides of resistance means 26 and 28 and a second side of coil 13 are connected to signal conditioner 17 and to a positive terminal T3 of a DC power supply 30. A second side of resistance means 32 is connected to a first side of a detector coil 20, to signal conditioner 17, to switching means 11, to negative terminal T4 of DC power supply 30, and to a terminal T1 of AC power supply 41. A second side of capacitor 24 is connected through a selector means 14 to a second side of a detector coil 20. Resistance means 26, 28, and 32 comprise resistors 27, 29, and 33 respectively.

Signal conditioner 17 includes a second NPN transistor 35, the base B of which is connected through a capacitor 36 to emitter E of transistor 22 in detector/amplifier circuit 16. Base B of transistor 35 is also connected to a first side of a resistance means 37. The collector C of transistor 35 is connected to positive terminal T3 of a DC power supply 30 and to the second sides of resistance means 26 and 28. The emitter E of transistor 35 is connected to switching means 11. A second side of resistance means 37 is connected to a second side of resistance means 32 of detector/amplifier circuit 16, to switching means 11, to negative terminal T4 of DC power supply 30, to a first side of coil 20, and to terminal T1 of AC power supply 41. Resistance means 37 comprises resistor 38.

Switching means 11 for switching AC current from an AC power supply 41 to liquid controller 42 comprises triac 39. A gate G of triac 39 is connected to emitter E of transistor 35 of signal conditioner 17. Main terminal MT1 of triac 39 is connected to second sides of resistance means 37 and 32, to the first side of coil 20, to a terminal T1 of AC power supply 41, and also to terminal T4 of DC power supply 30. Main terminal MT2 of traic 39 is connected to liquid controller 42.

Liquid controller 42 comprises an electrically operated valve such as a solenoid valve 43 activated by solenoid coil 44, as depicted in the embodiment illustrated in FIG. 1. A first side of solenoid coil 44 is connected to MT2 of traic 39; a second side of coil 44 is connected to terminal T2 of AC power supply 41. Solenoid valve 43 controls the flow of a liquid 40 from a liquid source 31 into container 23.

In the illustrated embodiment, the DC power supply 30 is shown with terminals T3 and T4 designated as positive and negative respectively. In another embodiment wherein transistors 22 and 35 are PNP instead of NPN as shown, the terminals T3 and T4 are negative and positive respectively.

Figure 2:
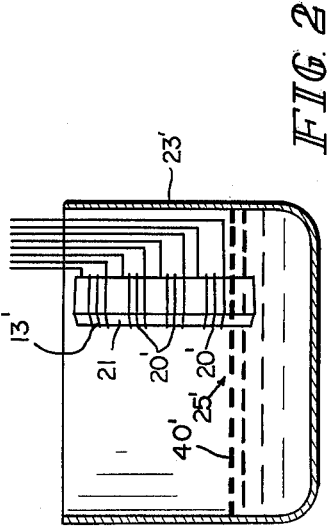
FIG. 2 shows another embodiment of a coil former and inductance means that can be used in a liquid level control system.

Inductance means 12 is shown with different coil formers in FIGS. 1 and 2. In FIG. 1, failsafe coil 13 and detector coils 20 are shown wound around coil former 45 which is the outside of a hollow tube 18. The tube may have thin walls and should be constructed of a non-magnetic and non-electrically conductive material such as a thermoplastic. In FIG. 2, coils 13' and 20' are illustrated wound around the outside of a coil former 21. The coils 13' and 20' are connected to circuit 10 as are coils 13 and 20 in FIG. 1. The coils may be electrically insulated from a liquid 40' such as with a thin dip coating of latex. The coil former 21 is placed in a container 23' and liquid 40' is allowed to rise around it. In this embodiment, liquid rises around the outside of coil former 21, whereas in FIG. 1, the liquid rose up through tube 18. Upon reaching the proximity of a coil 20', selected by selector means 14, the presence of liquid 40' is detected by that coil.

In FIG. 1, container 23 includes a liquid supply means 25 for supplying a liquid in close proximity to inductance means 12. Liquid supply means 25 in FIG. 1 comprises the inside of hollow tube 18. The relative size or cross-sectional shape of liquid supply means 25 is immaterial as long as it is connected to container 23 so that the level of a liquid 40 is the same in each.

In FIG. 2, a liquid supply means 25' comprises container 23' which not only holds liquid 40' but also provides the liquid into close proximity to coils 13' and 20'.

Container 23 in FIG. 1 is shown as a combination of an outer tub 46 and an inner tub 48 of a clothes washing machine 51. Machine 51 further includes a motor 50 and an agitating vane 49 connected to motor 50 and disposed in inner tub 48. Liquid source 31 in this example can be a water supply. Selector means 14 can be a manual selector switch that can be used by an operator to select a different water level for different sizes of clothes loads. It should be understood that a clothes washing machine is only one example where liquid level control system 10 may be used.

The operation of liquid level control system 10 is the same regardless of the shape and location of the coils used. A DC voltage is applied to the circuit from DC power supply 30. Transistor 22, in conjunction with coil 13, resistance means 26, 28, and 32, capacitor 24, and one of coils 20, will oscillate when properly connected to DC power supply 30. One example of the frequency of oscillation is 2 megahertz. The oscillation occurs at approximately the self-resonant frequency of the coil 20 used. Resistance means 26 is one means of providing an appropriate bias to base B of transistor 22. The required phase shift for oscillation is provided by transistor 22, failsafe coil 13, and one of detector coils 20. Resistance means 28 acts to lower the effective Q of detector coil 13. Resistance means 32 provides a suitable impedance across which to develop an oscillatory output signal. Resistance means 32 also acts to provide degeneration in the oscillator and so acts as a sensitivity adjustment. As the level of liquid 40 rises and comes into close proximity to a coil 20, the electrical conductivity of the liquid changes the Q of the coil and oscillation of detector/amplifier circuit 16 ceases. Therefore, the signal appearing across resistance means 32 changes. This change is detected by signal conditioner 17, amplified by transistor 35 and used to trigger switching means 11.

Switching means 11 switches AC from AC power supply 41 to the solenoid 44 of liquid controller 42 and closes solenoid valve 43. This action, therefore, stops the supply of liquid 40 from its source 31 to container 23 upon detection of the level of liquid 40.

Should coil 20 prove ineffective in extinguishing oscillation, for example, if a dry film accumulation builds up in the proximity of coil 20 and desensitizes its detection characteristics, then failsafe coil 13 will still act to extinguish oscillation when the liquid rises to the proximity of this failsafe coil. The functions of coil 20 and coil 13 can be interchanged. Coil 13 and coil 20 can both function as liquid presence detectors, as might be used with two adjacent containers simultaneously filling at approximately the same rate. In this example, filling can be terminated when either container's liquid contents reach a predetermined level.

What is claimed is:

1. A liquid level control system comprising:
   a. a container holding a liquid;
   b. an inductance means for producing an inductance field;
   c. a supply means carried by said container for providing said liquid in close proximity to said inductance means;
   d. a detector/amplifier circuit connected to said inductance means, said detector/amplifier circuit in combination with said inductance means comprising an oscillator circuit to provide electrical oscillations therein, said detector/amplifier circuit providing an electrical signal in response to a quenching of said oscillations when said liquid is in close proximity to said inductance means, said detector/amplifier circuit comprising:

a first transistor, the base of which is connected to a first side of a capacitance means and a first side of a first resistance means, the collector of which is connected to a first side of a second resistance means and to a first side of said inductance means, and the emitter of which is connected to a first side of a third resistance means and to a signal conditioner;

second sides of said first and second resistance means and a second side of said inductance means connected to a first electric terminal of said direct current power supply and to said signal conditioner;

a second side of said third resistance means connected to a first side of said inductance means, to said signal conditioner, to a switching means, to a second electric terminal of said direct current power supply, and to a first electric terminal of an alternating current power supply;

a second side of said capacitance means connected to a second side of said inductance means;

e. an electrically-operated valve responsive to said electrical signal for controlling a flow of said liquid into said container;
   f. a direct current power supply connected to said detector/amplifier circuit; and
   g. an alternating current power supply connected to said electrically-operated valve.

2. A liquid level control system according to claim 1 wherein said inductance means comprises a first detector coil for detecting the presence or absence of said liquid and a fail safe coil for detecting the presence of said liquid in the event of failure of said detector coil, and wherein:
   said collector is connected to a first side of said fail safe coil,
   a second side of said fail safe coil is connected to a first electrical terminal of said direct current power supply and to said signal conditioner,
   said second side of said third resistance means connected to a second side of said first detector coil.

3. A liquid level control system according to claim 2 further including a plurality of additional detector coils and a selector means for selecting one of said detector coils for operation with said detector/amplifier circuit.

4. A liquid level control system according to claim 2 wherein said signal conditioner comprises:
   a. a second capacitor, one side of which is connected to said emitter of said first transistor of said detector/amplifier circuit;
   b. a second transistor, the base of which is connected to a second side of said second capacitor and to a first side of a fourth resistance means, the emitter of which is connected to a switching means, and the collector of which is connected to said first electric terminal of said direct current power supply and to second sides of said first and second resistance means and second side of said failsafe coil; and
   c. said fourth resistance means connected between said base of said second transistor and said electric terminal of said direct current power supply.

5. A liquid level control system according to claim 4 wherein said resistance means comprise resistors.

6. A liquid level control system according to claim 4 wherein said switching means comprises a triac, the gate of which is connected to said emitter of said second transistor, main terminal 1 of which is connected to said second electric terminal of said DC power supply and also to a first terminal of an AC power supply, and main terminal 2 of which is connected to said liquid controller.

7. A liquid level control system comprising:
   a. a container
   b. an inductance means for producing an inductance field;
   c. a supply means for providing a liquid in communication with said inductance means;
   d. a detector/amplifier circuit connected to said inductance means, said detector/amplifier circuit in combination with said inductance means comprising an oscillator circuit to provide electrical oscillations therein, said detector/amplifier circuit including means adjusting the sensitivity of said circuit such that said liquid in close proximity to said inductance means causes said oscillations to be quenched, said detector/amplifier circuit providing an electrical signal when said oscillations are quenched;
   e. an electrically-operated valve responsive to said electrical signal for controlling a flow of liquid into said container;
   f. an electrical power supply connected to said oscillator circuit; and
   g. an electrical power supply connected to said electrically-operated valve.

8. The liquid level control system as recited in claim 7 further including:
   a. a signal conditioner connected to said detector/amplifier circuit for amplifying said electrical signal; and
   b. a switching means responsive to said amplified signal of said detector/amplifier circuit for providing power to said electrically operated valve from said alternating current power supply.

9. A liquid level control system according to claim 8 wherein said inductance means comprises a first detector coil for detecting the presence of said liquid and a failsafe coil for detecting the presence of said liquid in the event of failure of said detector coil.

10. A liquid level control system according to claim 9 further including at least one second detector coil connected to said first detector coil and a selector means connected between said first and second detector coils and said detector/amplifier circuit for selecting one of said detector coils for use with said detector/amplifier circuit.

11. A liquid level control system according to claim 9 wherein said first detector coil and said failsafe coil are wound on a coil former.

12. A liquid level control system according to claim 11 wherein said coil former is a hollow tube through which the level of said liquid may rise and fall, said first detector and failsafe coils wound on the outside of said hollow tube.

13. A liquid level control system according to claim 11 wherein said coil former is a member positioned in a container around which the level of said liquid may rise and fall, and said first detector and failsafe coils are wound on the outside of said coil former.

14. A liquid level control system according to claim 12 wherein an inside of said hollow tube comprises said supply means.

15. A liquid level control system according to claim 13 wherein said supply means comprises said container.

16. A liquid level control system according to claim 9 wherein said detector/amplifier circuit comprises:
  a. a first transistor, the base of which is connected to a first side of a capacitance means and a first side of a first resistance means, the collector of which is connected to a first side of a second resistance means and to a first side of said failsafe coil, and the emitter of which is connected to a first side of a third resistance means and to a signal conditioner;
  b. second sides of said first and second resistance means and a second side of said failsafe coil connected to a first electric terminal of said direct current power supply and to said signal conditioner;
  c. a second side of said third resistance means connected to a first side of said first detector coil, to said signal conditioner, to a switching means, to a second electric terminal of said direct current power supply, and to a first electric terminal of an alternating current power supply;
  d. a second side of said capacitance means connected to a second side of said first detector coil.

17. A liquid level control system according to claim 16 further including a plurality of additional detector coils and a selector means for selecting of said detector coils for operation with said detector/amplifier circuit.

18. A liquid level control system according to claim 16 wherein said signal conditioner comprises:
  a. a second capacitor, one side of which is connected to said emitter of said first transistor of said detector/amplifier circuit;
  b. a second transistor, the base of which is connected to a second side of said second capacitor and to a first side of a fourth resistance means, the emitter of which is connected to a switching means, and the collector of which is connected to said first electric terminal of said direct current power supply and to second sides of said first and second resistance means and second side of said failsafe coil; and
  c. said fourth resistance means connected between said base of said second transistor and said second electric terminal of said direct current power supply.

19. A liquid level control system according to claim 18 wherein said resistance means comprise resistors.

20. A liquid level control system according to claim 18 wherein said switching means comprises a triac, the gate of which is connected to said emitter of said second transistor, main terminal (1) of which is connected to said second electric terminal of said DC power supply and also to a first terminal of an AC power supply, and main terminal (2) of which is connected to said liquid controller.

21. A liquid level control system according to claim 7 wherein said electrically-operated valve comprises a solenoid valve connected to a liquid source and positioned in spaced relation to said container to permit flow of said liquid into said container, wherein said solenoid valve is connected to said alternating current power supply and to a switching means, whereby said switching means, in response to a signal from said detector/amplifier circuit, switches power to said solenoid valve.

22. A liquid level control system according to claim 7 wherein said means adjusting the sensitivity of said oscillator circuit includes a means providing degeneration of said oscillator circuit.

23. A liquid level control system according to claim 22 wherein said means providing degeneration of said oscillator circuits comprises a resistance means connected between said inductance means and said detector/amplifier circuit.

24. A liquid level control system comprising:
  a. a container
  b. an inductance means for producing an inductance field;
  c. a supply means providing a single liquid level in close proximity to said inductance means;
  d. a detector/amplifier circuit connected to said inductance means, said detector/amplifier circuit in combination with said inductance means comprising an oscillator circuit to provide electrical oscillations therein, said detector/amplifier circuit providing an electrical signal in response to a quenching of said oscillations when said single liquid level is in close proximity to said inductance means.
  e. an electrically-operated valve responsive to said electrical signal for controlling a flow of liquid into said container;
  f. a direct current power supply connected to said oscillator circuit; and
  g. an electrical power supply connected to said electrically-operated valve.

25. A liquid level control system comprising:
  a. a container
  b. an inductance means for producing an inductance field;
  c. a supply means providing a liquid in communication with said inductance means;
  d. a detector/amplifier circuit connected to said inductance means to provide electrical oscillations, said detector/amplifier circuit including means adjusting the sensitivity of said circuit such that said liquid communicating with said inductance means causes said electrical oscillations to be quenched, said detector/amplifier circuit providing an electrical signal when said oscillations are quenched.
  e. an electrically-operated valve responsive to said electrical signal for controlling a flow of liquid into said container;
  f. an electrical power supply connected to said detector/amplifier circuit; and
  g. an electrical power supply connected to said electrically-operated valve.

26. A method for controlling the level of a liquid in a container comprising the steps of:

a. introducing a liquid into a container through an electrically-operated valve from a liquid source;
b. connecting a detector/amplifier circuit to an inductance means so as to provide an oscillator circuit to provide electrical oscillations;
c. bringing a supply of liquid in close proximity to said inductance means so as to provide a liquid level approaching said inductance means;
d. detecting a quenching of said oscillations in response to said level of said liquid coming into close proximity to said inductance means so as to produce an electrical signal in said detector/amplifier circuit; and
e. closing said electrically-operated valve in response to said electrical signal so as to stop the flow of liquid into said container.

27. In a fabric washing machine having a tub capable of holding a washing liquid consisting essentially of water, a duct connected between a water supply and said tub, and an electrically-operated valve carried by said duct, the improvement comprising:
a. a hollow tube connected to a lower portion of said tub through which said washing liquid rises and falls in correspondence to the rising and falling of said washing liquid in said tub;
b. a coil of wire carried on the outside of said hollow tube;
c. a detector/amplifier circuit connected to said coil of wire, said detector/amplifier circuit in combination with said coil of wire comprising an oscillator circuit to provide electrical oscillations therein, said detector/amplifier circuit including means adjusting the sensitivity of said circuit such that said washing liquid rising in said tube causes said oscillations to be quenched, said detector/amplifier circuit providing an electrical signal when said oscillations are quenched;
d. an electric power supply connected to said detector/amplifier circuit;
e. an electric power supply connected to said electrically-operated valve; and
f. a switching means connected to said detector/amplifier circuit, said electrically-operated valve, and said second named electric power supply, for providing current to said electrically-operated valve in response to said quenching of oscillation in said coil of wire.

* * * * *